US009862406B2

United States Patent
Toda et al.

(10) Patent No.: US 9,862,406 B2
(45) Date of Patent: Jan. 9, 2018

(54) ELECTRIC POWER STEERING CONTROL APPARATUS AND ELECTRIC POWER STEERING CONTROL METHOD

(71) Applicant: Mitsubishi Electric Corporation, Tokyo (JP)

(72) Inventors: Taizo Toda, Tokyo (JP); Jiro Okada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/022,047

(22) PCT Filed: Nov. 8, 2013

(86) PCT No.: PCT/JP2013/080237
§ 371 (c)(1),
(2) Date: Mar. 15, 2016

(87) PCT Pub. No.: WO2015/068260
PCT Pub. Date: May 14, 2015

(65) Prior Publication Data
US 2016/0229444 A1 Aug. 11, 2016

(51) Int. Cl.
B62D 5/04 (2006.01)
(52) U.S. Cl.
CPC ............ B62D 5/046 (2013.01); B62D 5/0487 (2013.01)
(58) Field of Classification Search
CPC ............................. B62D 5/046; B62D 5/0487
See application file for complete search history.

(56) References Cited

U.S. PATENT DOCUMENTS

| 2004/0128042 | A1 | 7/2004 | Takahashi et al. |
| 2011/0163708 | A1 | 7/2011 | Mukai et al. |
| 2013/0090809 | A1 | 4/2013 | Kuroda |
| 2013/0320905 | A1* | 12/2013 | Uryu .................. H02K 11/001 318/490 |

FOREIGN PATENT DOCUMENTS

| JP | 2004-182039 A | 7/2004 |
| JP | 2005-32261 A | 2/2005 |

(Continued)

OTHER PUBLICATIONS

Communication dated Aug. 23, 2016 from the Japanese Patent Office in counterpart application.

(Continued)

*Primary Examiner* — Michael D Lang
(74) *Attorney, Agent, or Firm* — Sughrue Mion, PLLC; Richard C. Turner

(57) ABSTRACT

An initial check is executed individually on each group of a plurality of groups constituted by a plurality of multiphase windings (3a, 3b) of a motor (3) and a plurality of inverter circuits (9a, 9b) corresponding respectively thereto, opening/closing control is executed on a plurality of relays (6a, 6b) in accordance with an implementation result of the initial check so that respective timings at which power is supplied to the plurality of inverter circuits are offset, and drive control is executed on the plurality of inverter circuits in accordance with the implementation result of the initial check so that respective currents passed through the plurality of multiphase windings are offset.

9 Claims, 4 Drawing Sheets

(56) References Cited

FOREIGN PATENT DOCUMENTS

| JP | 5146851 B2 | 2/2013 |
| JP | 2013-79027 A | 5/2013 |
| WO | 2013/105225 A1 | 7/2013 |

OTHER PUBLICATIONS

International Search Report for PCT/JP2013/080237 dated Dec. 17, 2013 [PCT/ISA/210].
Written Opinion for PCT/JP2013/080237 dated Dec. 17, 2013 [PCT/ISA/237].
Communication dated Mar. 3, 2017, from the State Intellectual Property Office of People's Republic of China in counterpart Application No. 201380080730.0, 17 pages with translation.

* cited by examiner

ELECTRIC POWER STEERING CONTROL APPARATUS AND ELECTRIC POWER STEERING CONTROL METHOD

CROSS REFERENCE TO RELATED APPLICATIONS

This application is a National Stage of International Application No. PCT/JP2013/080237, filed on Nov. 8, 2013, the contents of all of which are incorporated herein by reference in their entirety.

TECHNICAL FIELD

This invention relates to an electric power steering control apparatus that includes a motor having a plurality of multiphase windings, and a plurality of inverter circuits for driving the respective multiphase windings of the motor independently, and to an electric power steering control method.

BACKGROUND ART

A conventional electric power steering control apparatus includes a motor having a plurality of sets of multiphase windings, and a plurality of inverter circuits for driving the respective multiphase windings of the motor independently. In a two-winding, three-phase motor (a single motor having two three-phase windings), for example, the respective three-phase windings are independent of each other, and the two independent inverter circuits likewise exist independently. Hence, the two three-phase windings do not necessarily have to be driven simultaneously, and instead, the two three-phase windings may be activated independently.

Further, when power is introduced into the conventional electric power steering control apparatus, a so-called initial check is executed to determine whether or not a fault has occurred in a motor driving unit including the plurality of multiphase windings of the motor and the plurality of inverter circuits. When a fault is not detected, electric power steering is started for the first time via the motor driving unit.

When a fault is detected, however, either the location of the fault in the motor driving unit is not used or the power supply is interrupted, depending on the content of the fault. Further, in a two-winding, three-phase motor such as that described above, a current may be supplied to the two windings simultaneously irrespective of whether or not a fault has been detected in consideration of a difference between respective drive start timings of the three-phase windings, which is due to a phase deviation between the three-phase windings in terms of respective electric angles thereof (see PTL 1, for example).

CITATION LIST

Patent Literature

[PTL 1]
Japanese Patent Publication No. 5146851

SUMMARY OF INVENTION

Technical Problem

However, the following problem occurs in the prior art.
The electric power steering control apparatus according to PTL 1 waits for all of the fault diagnosis processing to be completed before starting to supply a current simultaneously to the respective multiphase windings of the motor. Here, a CPU installed in the electric power steering control apparatus normally performs fault determination processing as soon as power is introduced into the control apparatus. When a current is supplied simultaneously to the respective multiphase windings of the motor immediately after engine startup or the like, however, the current may also flow rapidly to the engine, leading to an engine rotation malfunction.

Meanwhile, when control is implemented on a two-winding, three-phase motor having a phase deviation, such as that described above, the control is by nature phase deviation control, and therefore a current is unlikely to be supplied simultaneously to the respective multiphase windings of the motor and the engine. However, when a single CPU is provided and the processing performed by the CPU involves executing a fault check on the multiphase windings in sequence, one winding at a time, and waiting for each process to end before advancing to the next process, substantially twice the processing time is required in comparison with a single-winding, three-phase motor. As a result, the start of control may be delayed in a case where a driver operates a steering wheel after starting the engine.

This invention has been designed to solve the problem described above, and an object thereof is to obtain an electric power steering control apparatus and an electric power steering control method, the electric power steering control apparatus including a motor having a plurality of multiphase windings and a plurality of inverter circuits for driving the plurality of multiphase windings independently, with which simultaneous supply of a current to the respective multiphase windings can be suppressed so that electric power steering control can be started early.

Solution to Problem

An electric power steering control apparatus according to this invention includes: a motor having a plurality of multiphase windings; a plurality of inverter circuits that respectively drive-control the plurality of multiphase windings individually; a plurality of relays that are connected to a power supply at one end, and that respectively set the plurality of inverter circuits in a power supply condition individually when closed; and a control unit that implements an initial check upon reception of a power supply in order to determine whether or not a fault has occurred in a plurality of groups constituted by the plurality of multiphase windings and the plurality of inverter circuits corresponding respectively to the plurality of multiphase windings, and after implementing the initial check, executes power steering control on the basis of an implementation result of the initial check by executing drive control on the plurality of inverter circuits in accordance with opening/closing control executed on the plurality of relays and input information from a sensor group, wherein the control unit executes the initial check individually on each group of the plurality of groups, executes the opening/closing control on the plurality of relays in accordance with the implementation result of the initial check so that respective timings at which power is supplied to the plurality of inverter circuits are offset, and executes the drive control on the plurality of inverter circuits in accordance with the implementation result of the initial check so that respective currents passed through the plurality of multiphase windings are offset.

Further, an electric power steering control method according to this invention is executed by a control unit of an electric power steering control apparatus including: a motor having a plurality of multiphase windings; a plurality of inverter circuits that respectively drive-control the plurality of multiphase windings individually; a plurality of relays that are connected to a power supply at one end, and that respectively set the plurality of inverter circuits in a power supply condition individually when closed; and the control unit, which upon reception of a power supply, implements an initial check on a plurality of groups constituted by the plurality of multiphase windings and the plurality of inverter circuits corresponding respectively to the plurality of multiphase windings, and after implementing the initial check, executes power steering control on the basis of an implementation result of the initial check by executing drive control on the plurality of inverter circuits in accordance with opening/closing control executed on the plurality of relays and input information from a sensor group, the electric power steering control method including: an individual initial check execution step for executing the initial check individually on each group of the plurality of groups; an opening/closing control step for executing the opening/closing control on the plurality of relays in accordance with the implementation result of the initial check so that respective timings at which power is supplied to the plurality of inverter circuits are offset; and a drive control step for executing the drive control on the plurality of inverter circuits in accordance with the implementation result of the initial check so that respective currents passed through the plurality of multiphase windings are offset.

Advantageous Effects of Invention

According to this invention, the following control is performed on the plurality of groups constituted by the plurality of multiphase windings and the plurality of inverter circuits corresponding respectively to the plurality of multiphase windings.
(1) The initial check is executed individually on each group of the plurality of groups.
(2) The opening/closing control is executed on the plurality of relays in accordance with the implementation result of the initial check so that the respective timings at which power is supplied to the plurality of inverter circuits are offset.
(3) The drive control is executed on the plurality of inverter circuits in accordance with the implementation result of the initial check so that the respective currents passed through the plurality of multiphase windings are offset.

As a result, it is possible to obtain an electric power steering control apparatus and an electric power steering control method with which simultaneous supply of a current to the respective multiphase windings can be suppressed so that electric power steering control can be started early.

DESCRIPTION OF EMBODIMENTS

Preferred embodiments of an electric power steering control apparatus and an electric power steering control method according to this invention will be described below using the drawings. Note that identical or corresponding parts of the drawings will be described using identical reference symbols.

First Embodiment

Figure 1:
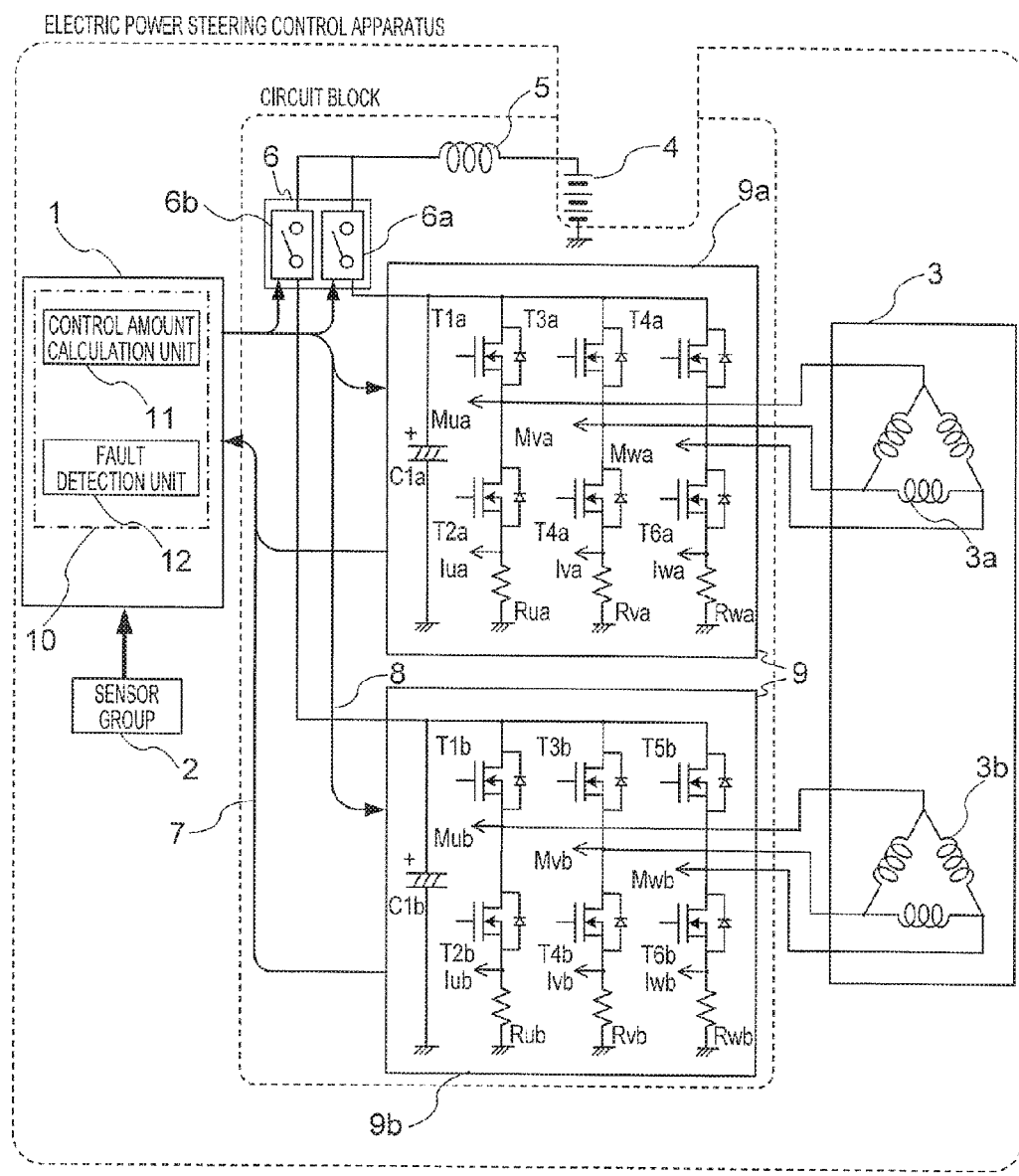
FIG. 1 is a view showing a configuration of an electric power steering control apparatus according to a first embodiment of this invention.

FIG. 1 is a view showing a configuration of an electric power steering control apparatus according to a first embodiment of this invention. First, using FIG. 1, the configuration of the electric power steering control apparatus according to the first embodiment and functions of respective constituent elements thereof will be described.

The electric power steering control apparatus shown in FIG. 1 is configured to include an ECU 1 (a control unit) that controls the electric power steering control apparatus, a sensor group 2 including a torque sensor, a vehicle speed sensor, and so on for detecting a torque and so on of an electric power steering apparatus, a two-winding, three-phase motor 3 that drives the electric power steering apparatus, and a circuit block (reference numeral 5 to reference numeral 9 in the drawing) of the electric power steering control apparatus.

Here, the circuit block includes a choke coil 5, relays 6, an input information signal group 7, a control signal group 8, and inverter circuits 9. In most cases, the circuit block is built into the ECU 1, but in FIG. 1, to facilitate description, the circuit block is shown to be disposed separately to the ECU 1. Note that the motor 3 is not limited to a two-winding, three-phase motor, and may be any n-winding, m-phase motor (where n and m are natural numbers equal to or larger than 2). In the following description, however, the motor 3 is assumed, for ease, to be a two-winding, three-phase motor. Further, in FIG. 1, two relays 6a, 6b and two inverter circuits 9a, 9b are configured identically, and are therefore differentiated by the reference symbols a and b.

The choke coil 5 prevents noise from escaping from the circuit block to the exterior of the electric power steering control apparatus. The relay 6a and the relay 6b are disposed independently in order to open and close connections between a battery 4 of the vehicle and the respective inverter circuits 9a and 9b, to be described below, in accordance with the control signal group 8 output by the ECU 1. The inverter circuits 9 are constituted by the inverter circuit 9a and the inverter circuit 9b, each of which includes a plurality of switching elements so as to be capable of driving respective multiphase windings 3a, 3b of the motor 3 independently.

Further, a CPU 10 is built into the ECU 1, and the control signal group 8 output to the relays 6 and inverter circuits 9 and the input information signal group 7 from the inverter circuits 9 are connected thereto. The CPU 10 includes a control amount calculation unit 11 that calculates and outputs a value of the control signal group 8 on the basis of information from the sensor group 2 and the input information signal group 7 from the inverter circuits 9, and a fault detection unit 12 that performs initial check processing on a motor driving unit including the plurality of multiphase windings 3a, 3b and the plurality of inverter circuits 9a, 9b. Note that the ECU 1 also includes an interface circuit network, not shown in the drawing.

Switching elements (T1 to T6) of upper and lower arms, shunt resistors (Ru, Rv, Rw) for detecting a phase current, and a capacitor C1 for preventing noise are built into each inverter circuit 9a, 9b in accordance with the respective multiphase windings 3a, 3b. Further, terminal voltages (Mu, Mv, Mw) of the motor 3 and resistance voltages (Iu, Iv, Iw) for detecting a current are respectively transmitted to the CPU 10 via the input information signal group 7 in order to obtain information relating to the inverter circuits 9a, 9b while the inverter circuits 9a, 9b are driven.

When power is introduced into the CPU 10 so that the CPU 10 starts to operate, processing of various installed programs is started. The control signal group 8 is transmitted to the relays 6 in order to close the relays 6, whereby a current from the battery 4 is supplied to the inverter circuits 9. Accordingly, the switching elements (T1 to T6) are driven via the control signal group 8, with the result that power is supplied to the multiphase windings 3a, 3b of the motor 3 such that the motor 3 starts to rotate. When the motor 3 rotates, a steering wheel operation is assisted.

Figure 2:
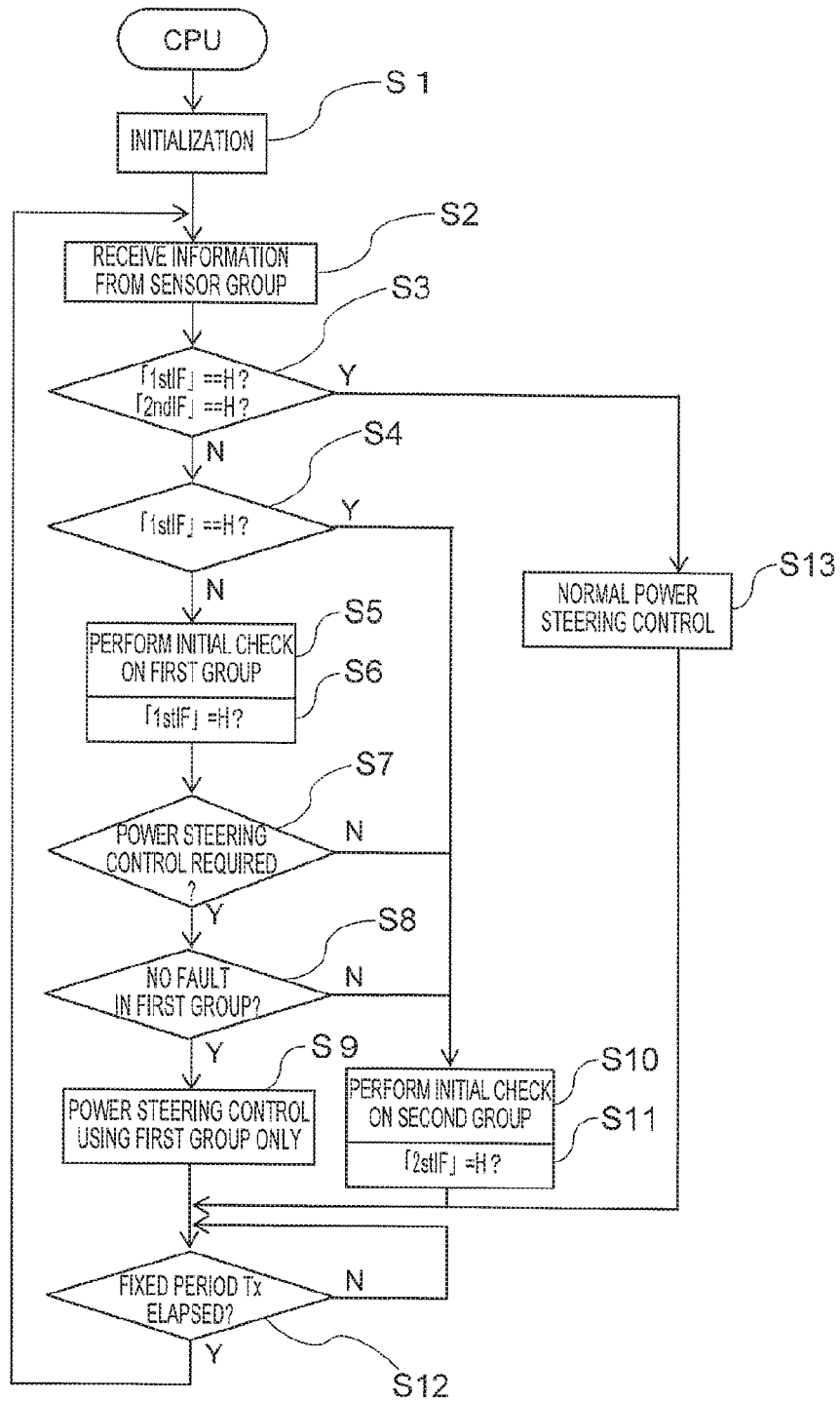
FIG. 2 is a flowchart showing an electric power steering control method according to the first embodiment of this invention.

The circuit configuration and basic operation described above are identical to those of a conventional electric power steering control apparatus. A technical feature of this invention, however, is that the initial check processing performed by the CPU 10 on the motor driving unit including the plurality of multiphase windings 3a, 3b and the plurality of inverter circuits 9a, 9b is improved in efficiency. Specific processing performed by the CPU 10 will therefore now be described using FIG. 2. FIG. 2 is a flowchart showing an electric power steering control method according to the first embodiment of this invention.

When power is introduced into the CPU 10, the CPU 10 initializes respective ports, a RAM, and so on in step S1. Next, in step S2, the CPU 10 receives various input information from the sensor group 2. The various input information includes, for example, information from a vehicle speed sensor and a torque sensor that detects an operation force applied to the steering wheel by a driver, information indicating the respective terminal voltages of the inverter circuits 9, and so on.

Next, in step S3, the CPU 10 checks whether or not an initial check performed when power is introduced has been executed. The initial check is executed every time power is introduced into the CPU 10 to determine whether or not a fault has occurred in the motor driving unit including the plurality of multiphase windings 3a, 3b and the plurality of inverter circuits 9a, 9b of the electric power steering control apparatus. The initial check processing corresponds to a part of the functions of the fault detection unit 12 shown in FIG. 1.

More specifically, in step S3, the CPU 10 determines whether or not the initial check has been performed on a motor driving unit (referred to simply as a "first group" hereafter) including the multiphase winding 3a and the inverter circuit 9a, which together form the first group, among the plurality of multiphase windings 3a, 3b and the plurality of inverter circuits 9a, 9b, and a motor driving unit (referred to simply as a "second group" hereafter) including the multiphase winding 3b and the inverter circuit 9b, which together form the second group. When the initial check has been performed, Y (Yes) is obtained, and when the initial check has not been performed, N (No) is obtained.

The check can be performed simply by setting or clearing a flag "$1^{st}$ IF" and a flag "$2^{nd}$ IF", to be described below. Note that in FIG. 1, two motor driving units exist, and therefore, in the check performed in step S3, a determination is made as to whether or not the check has been completed on both motor driving units.

When the check has not been performed on one or both of the two groups (N), the CPU 10 determines whether or not the check has been performed on the first group in step S4. When the check has not been performed on the first group (N), the CPU 10 executes the initial check on the multiphase winding 3a, the inverter circuit 9a, and so on of the first group in step S5.

In step S5, the CPU 10 performs several checks in sequence, for example whether or not the voltage of the battery 4 can be detected while the relay 6a shown in FIG. 1 is open, whether or not the voltage can be detected likewise when the relay 6a is closed, and whether or not a voltage is generated when the switching elements are driven. When a fault is not detected during this diagnosis processing, the CPU 10 sets the flag "$1^{st}$ IF" at "H" (High) in step S6. When the flag "$1^{st}$ IF" is set, this means that the initial check has been completed in relation to the first group.

Further, having determined that a fault has not occurred in the first group, the CPU 10 establishes a power supply by closing the relay 6a so that the inverter circuit 9a can be driven at any time.

When a fault is detected, on the other hand, the CPU 10 sets the flag "$1^{st}$ IF", but control processing after detection differs in content depending on the detected content. Depending on the condition of the fault, the CPU 10 may keep the relay 6a open. In this case, a mode in which power cannot be supplied to the multiphase winding 3a of the first group is established. Further, when a partial fault occurs in the switching elements, the CPU 10 may close the relay 6a so that power can be supplied, but implement so-called two-phase driving so that the system in which the fault has occurred, for example T1a or T2a, is not driven. In this case, the existence of the respective faults is clarified in accordance with the results of the check using corresponding fault cause flags (not shown).

Next, in step S7, the CPU 10 determines, from the various input information from the sensor group 2, whether or not control of the motor 3 is to be started immediately. When control of the motor 3 is required (Y), the routine advances to step S8. A case where the driver is performing a steering wheel operation, for example, or in other words a case where torque of at least a predetermined value is detected by the torque sensor, corresponds to this case.

Next, in step S8, the CPU 10 determines whether or not a fault has occurred in the first group on which the initial check has been performed. When a fault has not occurred, or in other words when the first group is normal, the routine advances to step S9, where power steering control is executed by the motor 3 using the first group alone. This control is similar to normal control processing to be described below, except that driving of the motor 3 is started using the first group alone. Further, since control of the motor 3 is being started for the first time, data relating to the inverter circuit 9a is not of great importance, and therefore the control signal group 8 may be output after being calculated in as simple a fashion as possible. In other words, in step S8, the CPU 10 executes calculation processing so that the control signal group 8 is calculated in a predetermined, maximally simplified fashion in relation to the inverter circuit 9a on which the initial check has been completed normally, and as a result, drive control can be executed earlier on the multiphase winding 3a.

When, on the other hand, a fault has occurred in the first group (N) in step S8, or the motor 3 does not require control (step S7: N), or the initial check has already been performed on the first group (step S4: Y), the routine advances to step S10, where the CPU 10 checks the multiphase winding 3b, the inverter circuit 9b, and so on of the second group. The content of the check is identical to that of the check performed on the first group. When a fault is not detected in the diagnosis processing of the initial check, the initial check completion flag "$2^{nd}$ IF" relating to the second group is set, and the relay 6b is closed. When a fault is detected, a signal is output to the relay 6b in accordance with the detected content, whereupon the initial check completion flag "$2^{nd}$ IF" is set.

When the initial check completion flags "$1^{st}$ IF" and "$2^{nd}$ IF" are both set in step S3, or in other words when the initial check has been completed in relation to the multiphase windings 3a, 3b, inverter circuits 9a, 9b, and so on of both groups (Y), the CPU 10 advances to step S13.

In step S13, the CPU 10 executes normal control processing on the electric power steering apparatus. More specifically, the CPU 10 calculates a target control amount on the basis of the various input information from the sensor group 2. The CPU 10 then calculates a final control amount by performing feedback control corresponding to a difference between the detected current of the motor 3 and the target value. Further, the CPU 10 outputs the control signal group 8 to the respective inverter circuits 9a, 9b in accordance with a phase difference between the multiphase windings 3a, 3b of the two groups.

Furthermore, when a fault occurs in at least one of the first group and the second group, the CPU 10 performs control to switch three-phase driving to two-phase driving or to drive only one of the groups in accordance with the condition of the fault. Moreover, the processing of step S13 also includes a periodical fault determination check that is similar or different to the initial check. For example, in step S13, the CPU 10 executes various other checks to detect a fault in one of the sensors, an abnormality in the voltages of the respective circuits, and so on.

When the routine advances to step S12 from one of steps S9, S11, and S13, the CPU 10 determines whether or not a fixed period Tx=5 msec, for example, has elapsed. When Tx has not elapsed (N), the CPU 10 remains on standby rather than advancing to the next step. When Tx has elapsed (Y), on the other hand, the routine returns to step S2, where the CPU 10 repeats the processing of the respective steps described above. As a result, the CPU 10 operates at intervals of the fixed period Tx so as to perform the processing of step S2 onward repeatedly.

Note that in the above description, the initial check is executed separately on the first group including the inverter circuit 9a and the multiphase winding 3a and the second group including the inverter circuit 9b and the multiphase winding 3b, and the diagnosis processing is executed preferentially on the first group. As regards other checks, such as checks on a ROM and a RAM provided in the interior of the CPU 10, the voltage of the battery 4, and relationships among the sensors in the sensor group 2, for example, degrees of priority may be determined in advance in relation to these checks. The checks may then be divided into those having a high degree of priority, which are included in the check performed on the first group, and those having a low degree of priority, which are included in the check performed on the second group. Alternatively, fault determinations in related sites required to start control of the first group may be inserted into the first group, and other fault determinations may be inserted into the second group. By executing division processing in this manner, control of the first group can be started as early as possible.

By providing the electric power steering control apparatus, which includes the motor 3 having the plurality of multiphase windings 3a, 3b and the plurality of inverter circuits 9a, 9b corresponding to the plurality of multiphase windings, with this control processing function, an order of precedence can be applied to the groups of multiphase windings 3a, 3b and inverters so that the initial check can be executed preferentially starting from a group having a high order of precedence. Thus, preparation of this group can be completed early, and as a result, control using the group can be started as soon as the initial check is complete.

Furthermore, once the initial check has been completed in relation to a subject group, a determination is made as to whether or not control is to be started using the subject group alone, and when it is necessary to start control, control is started initially using only the group for which preparation is complete. In comparison with a conventional apparatus in which the initial check is performed on the plurality of groups all at once, therefore, control can be started earlier, and as a result, power steering control can be implemented rapidly in accordance with the wishes of the driver.

Technical features realized by the processing executed by the CPU 10 according to the first embodiment, shown in FIG. 2, can be summarized as follows.

(1) The initial check is performed individually on the respective groups including the multiphase windings 3a, 3b and the inverter circuits 9a, 9b (step S5, step S10).

(2) Opening/closing control is executed on the plurality of relays 6a, 6b in accordance with the implementation result of the initial check so that the timings at which power is supplied to the plurality of inverter circuits 9a, 9b are offset. In the first embodiment in particular, the opening/closing control is executed on the corresponding relays 6a, 6b in order, starting from the group for which the initial check has been completed (steps S5, S6 and steps S10, S11).

(3) Drive control is performed on the plurality of inverter circuits 9a, 9b in accordance with the implementation result of the initial check so that the currents passed through the plurality of multiphase windings 3a, 3b are offset (step S9). In the first embodiment in particular, when a power steering control request is received as the input information at a point where the initial check has not yet been completed on all of the plurality of groups (step S7), the drive control is executed on the inverter circuit 9a, 9b of the group for which the initial check has been completed (step S9), in accordance with the implementation result of the initial check (step S8).

According to the first embodiment, as described above, when a steering operation performed by a driver is assisted by generating steering assist torque using an electric power steering control apparatus configured to include a plurality of groups of multiphase windings and inverter circuits, an initial check is implemented to detect a fault in the respective groups in sequence on the basis of an order of precedence allocated to the respective groups. Thus, a group for which the initial check has been completed can be prepared for the start of control by being set in a power supply condition in accordance with the result of the initial check, and if necessary, actual control can be started. In so doing, a fault can be determined and a control start timing can be set efficiently in relation to each group in accordance with the order of precedence rather than supplying power to the plurality of multiphase windings simultaneously, and as a result, motor control can be started earlier.

Second Embodiment

In the method described above in the first embodiment, which is applied to the electric power steering control apparatus configured to include the plurality of groups of multiphase windings 3a, 3b and inverter circuits 9a, 9b, when electric power steering control is required before the initial check has been completed on all of the groups, the groups are driven using control content corresponding to the diagnosis result in sequence, starting from the group for which the initial check has been completed. In a second embodiment, meanwhile, a method of driving at least one motor driving unit in which a fault is determined not to have occurred after performing the diagnosis processing on all of the motor driving units will be described.

Figure 3:
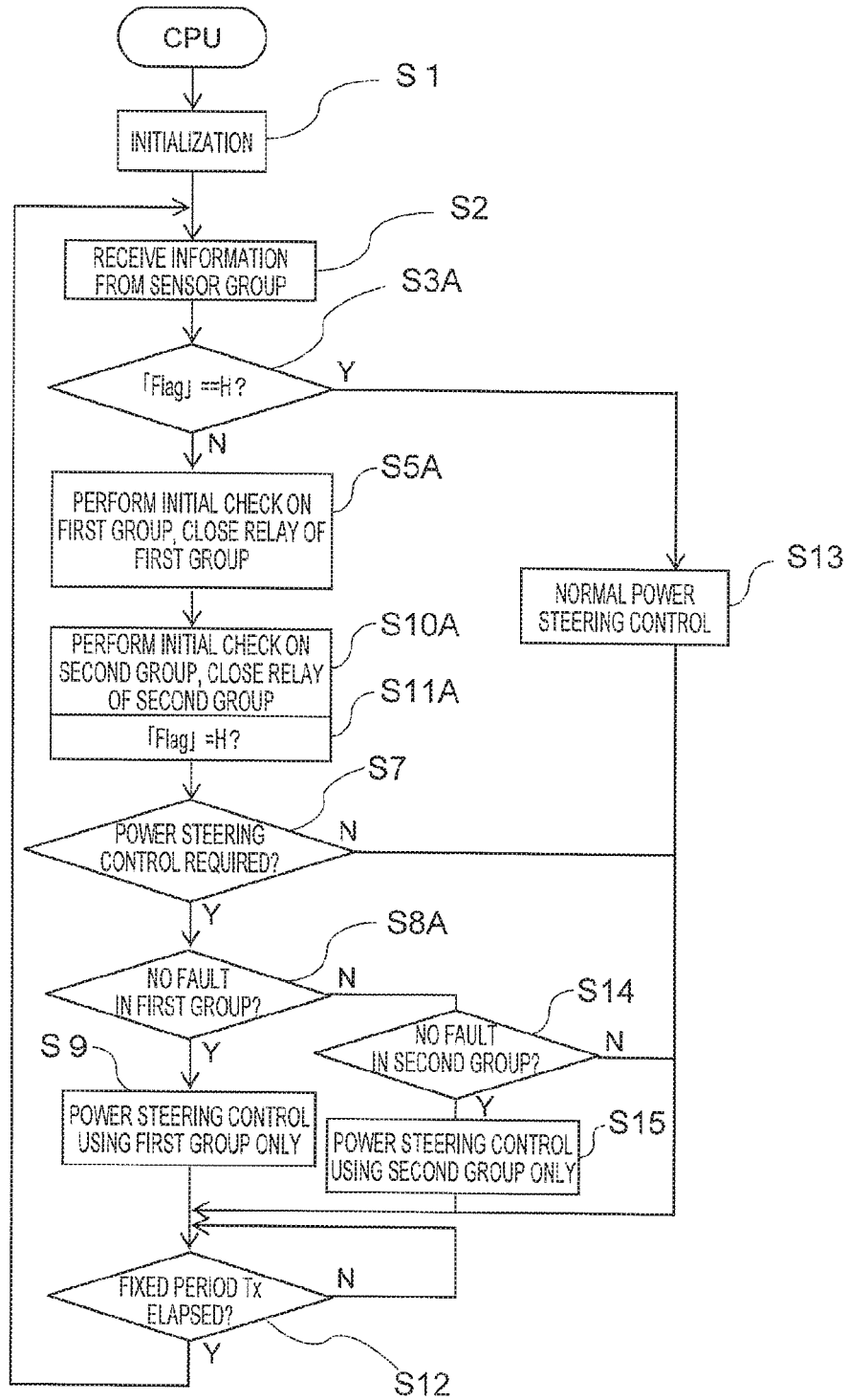
FIG. 3 is a flowchart showing an electric power steering control method according to a second embodiment of this invention.

FIG. 3 is a flowchart showing an electric power steering control method according to the second embodiment of this invention. Next, the initial check processing executed by the CPU 10 of the electric power steering control apparatus according to the second embodiment will be described using FIG. 3. Note that in FIG. 3, similar processes to the first embodiment, shown in FIG. 2, have been allocated identical reference symbols, and description of the steps having identical reference symbols has been omitted.

In step S3A, the CPU 10 determines whether or not the initial check has been performed. This determination can be made by checking a flag "Flag" to be described below. In the second embodiment, a single completion flag is used collectively for the groups of multiphase windings 3a, 3b and inverter circuits 9a, 9b instead of using individual completion flags for the respective groups. When the initial check has not been performed (N), the routine advances to step S5A, where the CPU 10 performs the initial check on the first group. The content of the initial check performed on the first group is identical to that of the first embodiment. In step S5A, the CPU 10 controls the relay 6a in accordance with the result of the initial check performed on the first group. More specifically, the relay 6a is closed when a fault has not occurred, and opened when the fault is large enough to cause an impediment.

Next, in step S10A, the CPU 10 performs the initial check on the second group in a similar manner to step S5A. Next, in step S11A, the CPU 10 sets the initial check flag "Flag" at High, and controls the relay 6b in accordance with the check result.

Hence, in the fault diagnosis processing of the electric power steering control apparatus according to the second embodiment, the initial check is performed consecutively on the two motor driving units. Next, having determined in step S7 that power steering control is required immediately, the CPU 10 determines in step S8A whether or not a fault has yet to occur in the first group. When a fault has occurred in the first group (N), the CPU 10 determines whether or not a fault has occurred in the second group in step S14. Here, when a fault has occurred (N), control cannot be performed, and therefore the processing is terminated as is, whereupon the routine advances to step S12.

When it is determined in step S8A that a fault has yet to occur (step S8A: Y), on the other hand, the CPU 10 calculates and outputs the control signal group 8 in step S9 so as to drive the multiphase winding 3a of the first group. Further, when it is determined in step S14 that a fault has not occurred (step S14: Y), the CPU 10 calculates and outputs the control signal group 8 in step S15 so as to drive the multiphase winding 3b of the second group.

Note that in step S9 or step S15, the CPU 10 may calculate and output the control amount of the control signal group 8 differently to the normal control amount of step S13. Here, control is to be started for the first time, and therefore, since the motor 3 is not currently being driven, information indicating the current, voltage, and so on of the motor 3, for example, is not required. Furthermore, the control amount is calculated and output normally in step S13 during the next predetermined period, and therefore the calculation processing of step S9 and step S15 can be simplified in comparison with that of step S13, enabling a reduction in the amount of time required to perform the processing.

Moreover, only one of the groups is driven initially, and therefore the calculation processing can be performed more quickly than the calculations performed in relation to the two groups in step S9 and step S15. Hence, when it is necessary to start controlling the electric power steering apparatus immediately, the control can be started earlier using only one of the groups.

Technical features realized by the processing executed by the CPU 10 according to the second embodiment, shown in FIG. 3, can be summarized as follows.

(1) The initial check is performed individually on the respective groups including the multiphase windings 3a, 3b and the inverter circuits 9a, 9b (step S5A, step S10A).

(2) Opening/closing control is executed on the plurality of relays 6a, 6b in accordance with the implementation result of the initial check so that the timings at which power is supplied to the plurality of inverter circuits 9a, 9b are offset. In the second embodiment in particular, the opening/closing control is executed on the corresponding relays 6a, 6b in sequence, starting from the group for which the initial check has been completed, within a single processing period (step S5A, steps S10A and S11A).

(3) Drive control is performed on the plurality of inverter circuits 9a, 9b in accordance with the implementation result of the initial check so that the currents passed through the plurality of multiphase windings 3a, 3b are offset (step S9, step S15). In the second embodiment in particular, when a power steering control request is received as the input information at a point where the initial check has been completed on all of the plurality of groups (step S7), drive control is executed on the inverter circuits 9a, 9b of the groups on which the initial check has been completed (steps S9, S15) in accordance with the implementation result of the initial check (step S8A, step S14).

According to the second embodiment, as described above, an initial check is performed on an electric power steering control device configured to include a plurality of groups of multiphase windings and inverter circuits in sequence on the basis of an order of precedence allocated to the respective groups. Preparation for the start of control can then be completed by controlling the relays independently so as to set the relays in a power supply condition in accordance with the results of the initial check.

Further, when at least one of the groups is normal, control is started initially using only that group. Instead of supplying power to the motor simultaneously, therefore, power steering control can be started efficiently in each group in accordance with the order of precedence, with the result that motor control can be started earlier. In other words, likewise in the second embodiment, similarly to the first embodiment, an electric power steering apparatus can be controlled at an early stage in accordance with the wishes of the driver.

Note that in the second embodiment, the initial check is completed in relation to the first and second groups before determining whether or not power steering control is required in step S7. Therefore, by combining the processing of step S8A and step S8B, following processing can be realized. When a fault has occurred in a part of the switching elements in the first group so that two-phase driving is necessary, but all of the components of the second group are normal so that normal, three-phase driving is possible, three-phase driving using the second group alone can be started instead of starting two-phase driving using the first group alone.

Third Embodiment

In the first and second embodiments, examples of case in which the ECU 1 includes the single CPU 10 were described. In a third embodiment, a method applied to an electric power steering control apparatus having two CPUs 10a, 10b, in which the respective CPUs 10 implement the initial check independently, will be described as an example of a case in which the ECU 1 includes a plurality of CPUs 10.

Figure 4:
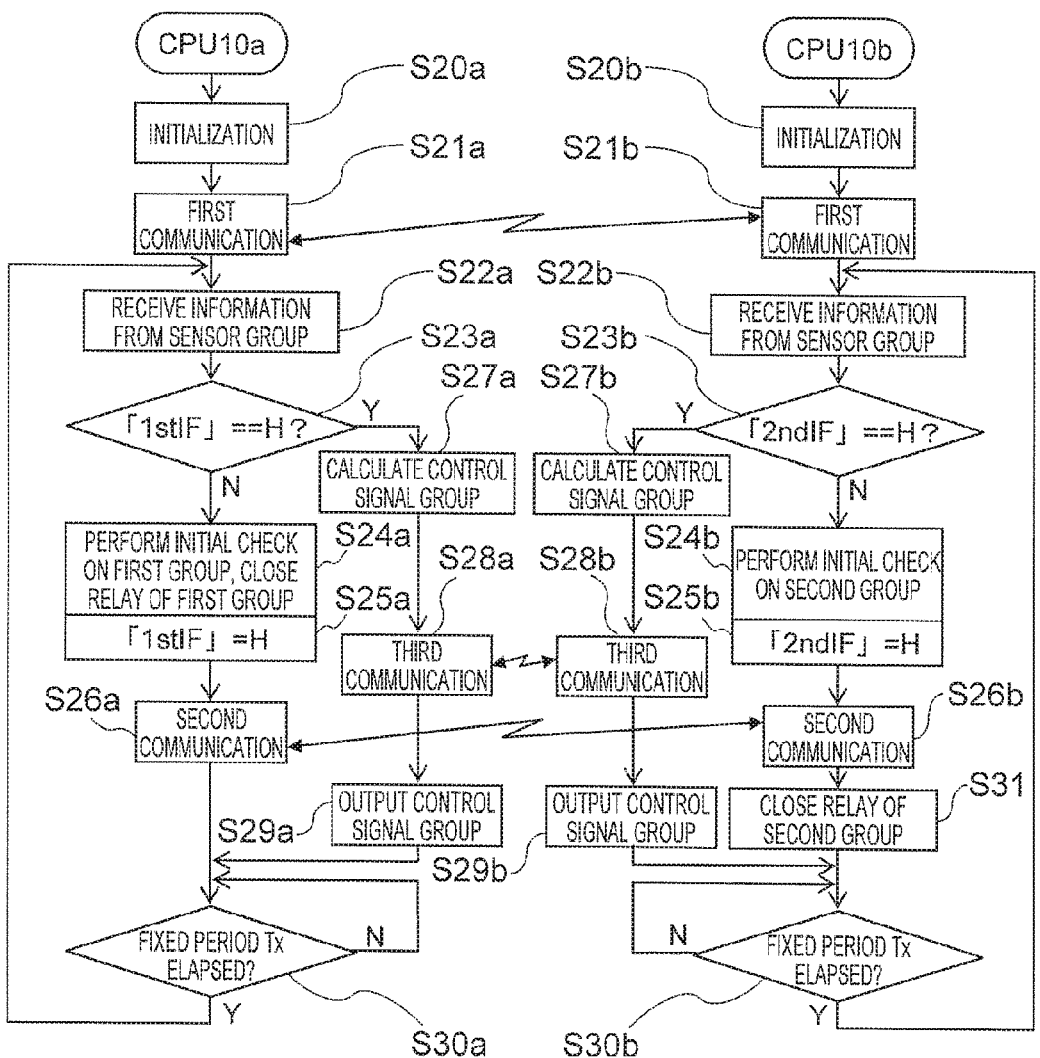
FIG. 4 is a flowchart showing an electric power steering control method according to a third embodiment of this invention.

FIG. 4 is a flowchart showing an electric power steering control method according to the third embodiment of this invention. Next, the initial check processing executed by the CPUs 10 of the electric power steering control apparatus according to the third embodiment will be described using FIG. 4.

In the first and second embodiments, the single CPU 10 controls the two inverter circuits 9a, 9b. In the third embodiment, on the other hand, the two CPUs 10a and 10b are provided so that the CPU 10a controls the inverter circuit 9a and the CPU 10b controls the inverter circuit 9b.

On the flowchart shown in FIG. 4, the reference symbol a has been added to processing steps implemented by the CPU 10a, while the reference symbol b has been added to processing steps implemented by the CPU 10b. Note, however, that the CPU 10a and the CPU 10b are equivalent CPUs 10, and the processing steps implemented thereby are substantially identical. Hereafter, therefore, the processing steps implemented by the CPU 10a will mainly be described. Note that the number of CPUs 10 is not limited to two, and any natural number above 1 may be used. In the following description, however, two CPUs 10 are envisaged for ease.

When power is introduced into the CPU 10a, first, in step S20a, the CPU 10a initializes the ports, the RAM, and so on. Next, in step S21a, prior to the start of the processing routine of the fixed period Tx, the CPU 10a communicates with the CPU 10b (referred to hereafter as "first communication"). At the stage of the first communication, control has not yet been started, and the CPU 10a has not yet obtained the input information and so on. The main aim of the first communication is therefore synchronization of the CPU 10a and the CPU 10b. Nevertheless, information such as the time, past data, and past faults held in the CPUs 10 may be included in communication data, and these communication data may be exchanged between the CPUs 10a, 10b. Further, after receiving the partner information, the respective CPUs 10a, 10b can synchronize with each other so as to be time-aligned.

Next, in step S22a, the CPU 10a receives the various input information from the sensor group 2, similarly to step S2 of FIG. 2. Next, in step S23a, the CPU 10a determines whether or not the initial check has been executed on the first group. Similarly to step S4 of FIG. 2, this determination can be made simply by checking a flag "$1^{st}$ IF", to be described below.

When the initial check is not complete (N), the CPU 10a advances to step S24a. In step S24a, the CPU 10a performs the initial check in relation to the multiphase winding 3a, the inverter circuit 9a, and so on of the first group. The CPU 10b, meanwhile, performs the initial check in a similar manner in relation to the multiphase winding 3b, the inverter circuit 9b, and so on of the second group in step S24a.

The content of the initial check performed on the first and second groups is similar to that of the first embodiment. Further, the checks not relating to the first and second groups, such as the checks performed in relation to the sensors and the voltage of the battery 4, can be divided between the CPU 10a and the CPU 10b or performed by only one of the CPUs 10. Alternatively, the checks can be performed independently by both the CPU 10a and the CPU 10b, whereupon the results obtained respectively thereby can be compared.

After performing the initial check on the first group, the CPU 10a sets the completion flag "$1^{st}$ IF" at High in step S25a. Furthermore, when a fault is not detected in the first group, the CPU 10a closes the relay 6a. When a fault is detected in the first group, the CPU 10a controls the relay 6a in accordance with the content of the fault, and then stores the fault content. In step S25b, meanwhile, the CPU 10b likewise sets a flag "$2^{nd}$ IF" at High. The CPU 10b also stores the content of the detected fault, but does not control the relay 6b in step S24b.

Next, in step S26a, the CPU 10a communicates with the CPU 10b again (referred to hereafter as "second communication"). In the second communication, the two CPUs 10 can synchronize with each other, and can also transmit the content of the fault detected during the initial check and compare the input information by exchanging data. As a result, the two CPUs 10 can learn the condition of the partner CPU 10, whether or not a fault has been detected, and so on, and can use this information to modify the content of the control performed thereby.

For example, when the motor 3 cannot be controlled due to a fault in one of the inverter circuits 9 or when only driving that is inferior to normal control, for example two-phase driving, is possible, the output of the other inverter circuit 9 on the normal side can be increased. Further, synchronization is performed at least once every fixed period Tx, and therefore a phase deviation can be maintained reliably between the control of the two groups.

Note that the CPU 10b controls the relay 6b in accordance with the result of the fault detection in step S31 rather than step S24b. By offsetting the timings at which the CPUs 10a and 10b respectively close the relays 6a and 6b in this manner, timings at which consumption currents are generated can be offset.

Next, in step S30a, the CPU 10a determines whether or not the fixed period Tx has elapsed, and in so doing can execute the processing of step S22a onward repeatedly at intervals of the fixed period Tx.

When the initial check has been implemented (Y) in step S23a, the CPU 10a determines in step S27a whether or not it is necessary to start control using the motor 3 immediately from the various input information from the sensor group 2. When power steering control is required, the CPU 10a calculates the control amount of the control signal group 8. Here, the CPU 10a calculates an output control amount by calculating the difference between the target control amount and the current of the motor 3 at the present time and performing feedback control in relation thereto.

Next, in step S28a, the CPU 10a communicates with the CPU 10b again (referred to hereafter as "third communication"). In the third communication, the two CPUs 10 can synchronize with each other as described above, and can also exchange data such as the control amount and the input information. The two CPUs 10 can also check whether or not a fault has occurred in the partner CPU.

Next, in step S29a, the CPU 10a performs processing to output the control signal group 8 in order to supply a current to the motor 3. In the output processing, the CPU 10a controls the switching elements of the inverter circuit 9a while the CPU 10b controls the switching elements of the inverter circuit 9b. In a case where the respective CPUs 10a, 10b divide the output control amount into two equal parts, the divided control amounts have identical average values but deviate from each other temporally. Further, the respective CPUs 10a, 10b can perform control such that instead of outputting equal control amounts, one of the CPUs 10a, 10b outputs a larger amount than the other in accordance with the condition of the fault.

Technical features realized by the processing executed by the CPU 10 according to the third embodiment, shown in FIG. 4, can be summarized as follows.
(1) The initial check is performed individually on the respective groups including the multiphase windings 3a, 3b and the inverter circuits 9a, 9b by the independent plurality of CPUs 10a, 10b (step S24a, step S24b).
(2) Opening/closing control is executed on the plurality of relays 6a, 6b in accordance with the implementation result of the initial check so that the timings at which power is supplied to the plurality of inverter circuits 9a, 9b are offset. In the third embodiment in particular, the different CPUs 10a, 10b execute the opening/closing control (step S24a, step S31) on the corresponding relays 6a, 6b while communicating with each other (steps S21a, S21b and steps S26a, S26b) so that the respective timings of the control do not overlap.
(3) Drive control is performed on the plurality of inverter circuits 9a, 9b in accordance with the implementation results of the initial check so that the currents passed through the plurality of multiphase windings 3a, 3b are offset (step S29a, step S29b). In the third embodiment in particular, when a power steering control request is received as the input information (step S27a, step S27b) while the different CPUs 10a, 10b communicate with each other (step S28a, step S28b), the respective CPUs 10a, 10b execute the drive control on the inverter circuits 9a, 9b in accordance with the implementation result of the initial check (step S29a, step S29b).

According to the third embodiment, as described above, even when a plurality of independent CPUs are provided, the timings at which control is started and power is supplied in relation to the plurality of multiphase wirings can be offset easily by sharing information through mutual communication.

Note that programs for realizing the processing of the flowchart shown in FIG. 4 are provided in an identical number to the number of CPUs 10a, 10b, i.e. two. However, the two programs differ from each other in the timings at which the relays 6a, 6b are controlled, the multiphase windings 3a, 3b of the motor 3 to be subjected to the control, and so on. Hence, by providing a flag that indicates the subject inverter circuit among the respective inverter circuits 9a, 9b of the first and second groups and inserting determination processing using the flag before the required processing routine, the processing can be realized by a single program, enabling a reduction in a number of steps required to create the program.

The invention claimed is:
1. An electric power steering control apparatus comprising:
   a motor having a plurality of multiphase windings;
   a plurality of inverter circuits that respectively drive-control the plurality of multiphase windings individually;
   a plurality of relays that are connected to a power supply at one end, and that respectively set the plurality of inverter circuits in a power supply condition individually when closed; and
   a control unit that implements an initial check upon receiving power in order to determine whether or not a fault has occurred in a plurality of groups constituted by the plurality of multiphase windings and the plurality of inverter circuits corresponding respectively to the plurality of multiphase windings, and after implementing the initial check, executes power steering control on the basis of an implementation result of the initial check by executing drive control on the plurality of inverter circuits in accordance with opening/closing control executed on the plurality of relays and input information from a sensor group,
   wherein the control unit executes the initial check individually on each group of the plurality of groups,
   executes the opening/closing control on the plurality of relays in accordance with the implementation result of the initial check so that respective timings at which power is supplied to the plurality of inverter circuits are offset, and
   executes the drive control on the plurality of inverter circuits in accordance with the implementation result of the initial check so that respective currents passed through the plurality of multiphase windings are offset.

2. The electric power steering control apparatus according to claim 1, wherein the control unit executes the initial check on the plurality of groups in sequence in accordance with a predetermined order of precedence, and executes the opening/closing control in sequence at fixed period intervals on corresponding relays of the plurality of groups on which the initial check has been completed, and
   when a power steering control request is received as the input information at a point where the initial check has not yet been completed on all of the plurality of groups, the control unit executes the drive control on an inverter circuit of a group for which the initial check has been completed, among the plurality of groups, in accordance with the implementation result of the initial check so that current passed through a multiphase winding of the group for which the initial check has been completed is offset.

3. The electric power steering control apparatus according to claim 2, wherein, when the power steering control request is received as the input information within an identical period to a period in which completion of the initial check is detected, the control unit executes the drive control using a certain control calculation processing.

4. The electric power steering control apparatus according to claim 1, wherein the control unit executes the initial check on the plurality of groups in sequence in accordance with a predetermined order of precedence, and executes the opening/closing control in sequence on corresponding relays of the plurality of groups on which the initial check has been completed within a single period, and
   when a power steering control request is received as the input information after the initial check has been completed on all of the plurality of groups, the control unit executes the drive control on the plurality of inverter circuits in accordance with the implementation result of the initial check so that the respective currents that have passed through the plurality of multiphase windings are offset.

5. The electric power steering control apparatus according to claim 4, wherein when the power steering control request is received as the input information within an identical period to a period in which completion of the initial check is detected, the control unit executes the drive control using a certain control calculation processing.

6. The electric power steering control apparatus according to claim 1, wherein the control unit includes a plurality of individual control units that correspond respectively to the plurality of groups so as to execute the initial check, the opening/closing control, and the drive control individually at fixed period intervals, the plurality of individual control units each including a communication processing unit that executes mutual communication with other individual control unit in order to share information relating to the implementation result of the initial check, an opening/closing control condition, and a drive control condition with the other individual control unit, and each of the plurality of individual control units executes the opening/closing control on a relay of a corresponding group in accordance with the implementation result of the initial check performed on the corresponding group and the implementation result of the initial check performed by the other individual control unit so that the respective timings at which the power is supplied to the plurality of inverter circuits are offset, and executes the drive control on an inverter circuit of the corresponding group in accordance with the implementation result of the initial check performed on the corresponding group and the implementation result of the initial check performed by the other individual control unit so that the respective currents passed through the plurality of multiphase windings are offset.

7. The electric power steering control apparatus according to claim 6, wherein each of the plurality of individual control units executes the mutual communication with the other individual control unit using the communication processing unit at least once during the fixed period, and when the plurality of individual control units includes two individual control units, one control unit of the two of individual control units executes the opening/closing control on the relay of the corresponding group before executing the mutual communication, while another control unit of the two of individual control units executes the opening/closing control on the relay of the corresponding group after executing the mutual communication.

8. The electric power steering control apparatus according to claim 6, wherein each of the plurality of individual control units employs an identical program configured to switch a timing at which processing for offsetting power supply timings is executed and a timing at which processing for offsetting the currents passed through the plurality of multiphase windings is executed, in accordance with a flag that is set in order to identify one of the plurality of groups.

9. An electric power steering control method executed by a control unit of an electric power steering control apparatus that includes:

a motor having a plurality of multiphase windings;

a plurality of inverter circuits that respectively drive-control the plurality of multiphase windings individually;

a plurality of relays that are connected to a power supply at one end, and that respectively set the plurality of inverter circuits in a power supply condition individually when closed; and the control unit, which upon receiving power, implements an initial check on a plurality of groups constituted by the plurality of multiphase windings and the plurality of inverter circuits corresponding respectively to the plurality of multiphase windings, and after implementing the initial check, executes power steering control on the basis of an implementation result of the initial check by executing drive control on the plurality of inverter circuits in accordance with opening/closing control executed on the plurality of relays and input information from a sensor group, the control method comprising:

executing the initial check individually on each group of the plurality of groups;

executing the opening/closing control on the plurality of relays in accordance with the implementation result of the initial check so that respective timings at which power is supplied to the plurality of inverter circuits are offset; and executing the drive control on the plurality of inverter circuits in accordance with the implementation result of the initial check so that respective currents passed through the plurality of multiphase windings are offset.

* * * * *